Nov. 15, 1966  J. ARTUR DU PLESSIS ETAL  3,285,222
GAS PRESSURE WARNING VALVE
Filed May 17, 1965
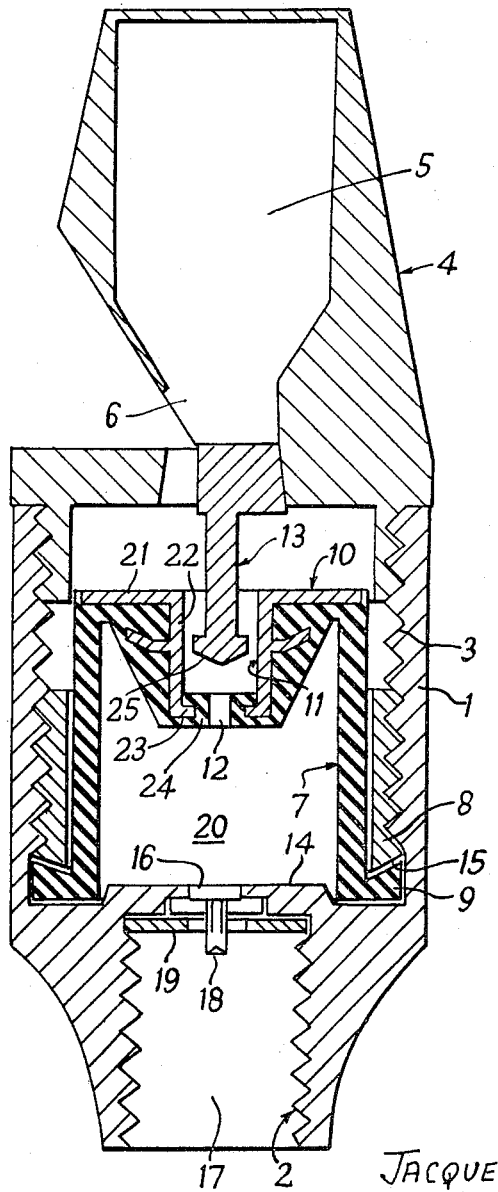
INVENTORS:
JACQUES A. DU PLESSIS
MARCEL HUGUES
RENÉ SAUBAL-BAYARD
JEAN LOUPIAC
ROLAND COUVERTURE
GEORGES TAILLEFER 3,285,222
GAS PRESSURE WARNING VALVE
Jacques Artur du Plessis, Marcel Hugues, Rene Saubal-Bayard, Jean Loupiac, Roland Couverture, and Georges Taillefer, all of 43 Rue St. Ferreol, Marseille, France
Filed May 17, 1965, Ser. No. 456,340
Claims priority, application France, May 19, 1964, 20,579
3 Claims. (Cl. 116—34)

The object of the invention is to provide a warning and control system for indicating pressure.

It is characterized by the means adopted, considered in conjunction with and independently of one another, and more particularly by a framework or rigid cylindrical body containing an elastic capsule which is likewise cylindrical and which is extensible and retractable, with a hermetic assembly at the base, subjected to the pressure of the container to be supervised, the upper part of this cylindrical capsule being reinforced by a rigid part with an axial cavity of which the base forms a movable valve head which, under the effect of the pressure, comes to rest on the normally fixed, but manually adjustable valve seat, the entire system being so constructed that when a reduction occurs in the pressure to be supervised the movable valve head becomes detached from the fixed valve seat and the air escapes through the upper profile, designed to give an audible warning.

In the accompanying drawings, provided by way of an example, without any limitative effect, of the device to which the invention relates, a longitudinal section of the apparatus is shown in its entirety.

The apparatus consists of a rigid cylindrical body 1, forming a valve plug, with a profiled and screw-threaded securing base 2.

Its upper part having an internal screw thread 3, the purpose of which is to accommodate the part 4 with its cavity 5 and bevelled portion 6, forming an audible warning device, such as a whistle.

The rigid cylinder body 1 accommodates a cylindrical capsule 7 of resilient material, stabilized and anchored by the ring, bevelled at the bottom, of which the profile corresponds to the toe 9 of the resilient part, in order to ensure complete hermeticity by means of this dovetailed fitting against the base 14 of the chamber 20 with the capsule 7.

The upper portion of this resilient capsule 7 is reinforced as a whole and rendered nondeformable by the rigid part 10, which is movable along the axis of the entire assembly, similarly to a piston crosshead. This rigid part 10 forms a cylindrical housing 11, comprising an upper horizontal portion 21, a vertical wall portion 22, a lower internal portion 23 forming a base 24, made of a flexible material and forming a continuous block with the mass of the capsule, said base is perforated at 12, constituting a valve accommodating the extremity 25 of the fixed valve seat 13, which, owing to its profile, engages perforation 12.

The base surface 14 of the part 1 comprises a peripheral groove 15, forming an axial shoulder, perforated at its centre 16, increasing the firmness with which the heel 9 of the resilient capsule 7 is secured by the ring 8.

The lower end is provided with a bore 17, accommodating the rigid hollow stop 18, axially positioned by the resilient washer 19, likewise perforated, providing a means of communication between the valve and the interior of the resilient chamber 20.

The operation and the advantages of this device will thus be evident.

The apparatus is screwed onto the container of gas under pressure (not shown) by the screw-threading 2 in the bore 17, until seated against the washer 19. This washer is pressed upward against the underside of the base 14. Air pressure penetrates into the capsule chamber 20, the latter expands axially away from the base 14 owing to the elongation of its side wall, and the movable base 24 perforated at 12 presses against the fixed valve seat 13, so that the assembly is completely gas-tight, without any possibility of leakage.

The assembly 8, 9, 14 and 15 is absolutely stable, whatever the stresses to which it is subjected in normal use, so that this point of articulation provides a functional device which cannot get out of order.

The upper portion of the resilient capsule 7 is reinforced, as a whole, by a rigid part 10, in the form of a cup, perforated in its centre. The resilient material of which the capsule is made extends about the axial centre of this reinforced part and is also perforated at 12.

This form of cup constitutes a self-centering system and positions the counterthrust below the centre of the thrust forces.

The resulting force exerted on the rigid valve seat 13 will be the greater, the larger is the upper internal surface of the resilient capsule and the smaller is the central orifice of the movable valve base 24 of flexible material 12.

When the pressure decreases, the seating 12 moves away from the fixed valve seat 13 by elastic contraction of the capsule 7 side wall, and the escaping air actuates the warning device. The fixed valve seat 13 is adjusted manually by screwing or unscrewing the warning system at the threads 3. This assembly, which is extremely simple in view of the very small number of parts, enables all springs, joints or other such devices to be dispensed with, and functions automatically, giving warning of insufficient or excess pressure.

The shapes, dimensions and arrangements adopted for the various elements may nevertheless vary, within the limits allowed by equivalent apparatus, as may also the materials used for their manufacture, without thereby departing from the general principle of the invention.

We claim:

1. A gas pressure responsive device comprising:
   (1) a hollow axially symmetrical valve body said valve body having a threaded inlet for connection with a source of gas pressure to be supervised at one end and an outlet at the other end;
   (2) a resilient axially extensible chamber anchored within said valve body and having a first opening juxtaposed said valve body inlet, the interior of said extensible chamber connected to means communicating pneumatically with said valve body inlet, and having a second opening to said valve body outlet;
   (3) said resilient chamber comprising: a radial wall and an axially deflectable perforate end wall remote from said inlet, said perforate end wall being reinforced by an integral rigid perforate member having perforation in register with the perforation of said chamber end wall to form a gas passage therethrough and to restrict elastic deformation of said end wall under gas pressure change;
   (4) a plug member connected to the outlet of said valve body, said plug member supporting a rigid valve seat projecting into said valve body in axial alignment with said perforation in said end wall of said resilient chamber, said valve seat being of larger diameter than said perforation and being shaped to engage and form a gas tight seal thereagainst when said perforation moves axially against said seat by axial extension of the radial wall of said resilient chamber; and
   (5) a gas pressure responsive signal device connected to the outlet of said valve body.

2. A gas-pressure supervising device, as claimed in claim 1 wherein said extensible chamber is a hollow cylindrical element of resilient material one end of which is open to said valve body inlet and the other end of which has an integral end wall in which said valve seat aperture is formed, said end wall being reinforced by a rigid tubular insert disposed with clearance about and axially guided by said valve seat.

3. A gas-pressure supervising device, as claimed in claim 2, wherein said hollow cylindrical element is provided about its open end with a peripheral radially outwards directed flange, and wherein said flange is gripped between said valve body and an axially adjustable member threaded into said valve body.

References Cited by the Examiner

UNITED STATES PATENTS

| | | | |
|---|---|---|---|
| 1,773,505 | 8/1930 | Tastenhoze et al. | 116—34 |
| 2,037,968 | 4/1936 | Duty et al. | 116—34 |
| 2,037,969 | 4/1936 | Duty et al. | 116—34 |
| 2,842,087 | 7/1958 | Burns | 116—34 |
| 2,921,551 | 1/1960 | Hagger | 116—34 |
| 2,948,256 | 8/1960 | Tapp | 116—34 |
| 3,106,183 | 10/1963 | Schlanger | 116—34 |

LOUIS J. CAPOZI, *Primary Examiner.*